United States Patent
Yao et al.

(10) Patent No.: US 7,733,607 B2
(45) Date of Patent: Jun. 8, 2010

(54) SUSPENSION WITH STRENGTHENING PLATE, HEAD GIMBAL ASSEMBLY, AND DISK DRIVE UNIT WITH THE SAME

(75) Inventors: MingGao Yao, DongGuan (CN); Takashi Honda, HongKong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 601 days.

(21) Appl. No.: 11/518,316

(22) Filed: Sep. 11, 2006

(65) Prior Publication Data
US 2007/0223144 A1 Sep. 27, 2007

(30) Foreign Application Priority Data
Mar. 24, 2006 (CN) .................. 2006 1 0071374

(51) Int. Cl.
G11B 21/24 (2006.01)
G11B 5/48 (2006.01)
(52) U.S. Cl. .................. 360/245; 360/245.9; 360/294.3
(58) Field of Classification Search ... 360/294.1–294.4, 360/245–245.1, 245.3, 245.4, 245.8–245.9
See application file for complete search history.

(56) References Cited
U.S. PATENT DOCUMENTS

| 5,852,532 | A | * | 12/1998 | Summers | 360/245.1 |
| 5,856,896 | A | * | 1/1999 | Berg et al. | 360/245.3 |
| 5,883,758 | A | * | 3/1999 | Bennin et al. | 360/245.9 |
| 5,896,248 | A | * | 4/1999 | Hanrahan et al. | 360/234.5 |
| 6,898,841 | B2 | * | 5/2005 | Shiraishi | 29/603.04 |
| 7,312,956 | B2 | * | 12/2007 | Yao et al. | 360/294.4 |
| 7,660,079 | B2 | * | 2/2010 | Yao et al. | 360/294.3 |
| 2005/0162783 | A1 | * | 7/2005 | Yao et al. | 360/294.4 |
| 2005/0286176 | A1 | * | 12/2005 | Yao et al. | 360/294.4 |
| 2006/0072247 | A1 | * | 4/2006 | Yao et al. | 360/294.4 |
| 2007/0070552 | A1 | * | 3/2007 | Yao et al. | 360/294.4 |
| 2007/0076327 | A1 | * | 4/2007 | Yang et al. | 360/294.4 |
| 2007/0153428 | A1 | * | 7/2007 | Yao et al. | 360/294.4 |

* cited by examiner

*Primary Examiner*—Brian E Miller
(74) *Attorney, Agent, or Firm*—Nixon & Vanderhye P.C.

(57) ABSTRACT

A suspension for a HGA includes a base plate, a flexure having a suspension tongue for holding a slider, a load beam, and a hinge that are assembled together; wherein a strengthening plate is formed on the suspension tongue to increase stiffness of the suspension tongue. So the invention enable the use of the suspension with lower pitch and roll stiffness while preventing the suspension deformation. This ensures the slider mounted on the suspension have a good flying performance. The invention also discloses a HGA with such a suspension and a disk drive unit having such an HGA.

15 Claims, 11 Drawing Sheets

SUSPENSION WITH STRENGTHENING PLATE, HEAD GIMBAL ASSEMBLY, AND DISK DRIVE UNIT WITH THE SAME

FIELD OF THE INVENTION

The present invention relates to an information recording disk drive unit, more particularly to a lower stiffness suspension, a head gimbal assembly (HGA), and a disk drive unit with such a suspension that are suitable for small size slider and micro-actuator.

BACKGROUND OF THE INVENTION

Disk drives are information storage devices that use magnetic media to store data. Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using for the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

As a way to improve the positional control of the read/write head, Various dual-stage actuator systems have been developed in the past for the purpose of increasing the speed and fine tuning the position of the read/write head over the desired tracks on high density storage media. Such dual-stage actuator systems typically include a primary voice-coil motor (VCM) actuator and a secondary micro-actuator, such as a PZT micro-actuator. The VCM actuator is controlled by a servo control system that rotates the actuator arm that supports the read/write head to position the read/write head over the desired information track on the storage media. The PZT micro-actuator is used in conjunction with the VCM actuator for the purpose of increasing the positioning speed and fine tuning the exact position of the read/write head over the desired track. Thus, the VCM actuator makes larger adjustments to the position of the read/write head, while the PZT micro-actuator makes smaller adjustments that fine tune the position of the read/write head relative to the storage media. In conjunction, the VCM actuator and the PZT micro-actuator enable information to be efficiently and accurately written to and read from high density storage media.

FIG. 1a illustrates a portion of a conventional disk drive unit and shows a magnetic disk 101 mounted on a spindle motor 102 for spinning the disk 101. A voice coil motor arm 104 carries a HGA 100 that includes a slider 103, incorporating a read/write head. A voice-coil motor (VCM) (not shown) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103 and the spinning magnetic disk 101. The lift force is opposed by equal and opposite spring forces applied by a suspension of the HGA such that a predetermined flying height above the surface of the spinning disk 101 is maintained over a full radial stroke of the motor arm 104.

FIG. 1b illustrates the HGA 100 of the conventional disk drive device of FIG. 1a. FIG. 1c is an enlarged, partial side perspective view of the HGA 100 of FIG. 1b. The HGA 100 includes the slider 103, a PZT micro-actuator 105, and a suspension 110 to support the slider 103 and the PZT micro-actuator 105. The suspension 110 comprises a base plate 113, a hinge 112, a load beam 115, and a flexure 114. The flexure 114 provides a suspension tongue 328 for supporting the slider 103 and the PZT micro-actuator 105 on the suspension 110. The load beam 115 has a dimple 329 formed thereon to support the suspension tongue 328. The PZT micro-actuator 105, as described above, is provided in order to improve the positional control of the slider 103. More particularly, the PZT micro-actuator 105 corrects the displacement of the slider 103 on a much smaller scale, as compared to the VCM, in order to compensate for the resonance tolerance of the VCM and the head suspension assembly. The PZT micro-actuator 105 enables, for example, the use of a smaller recording track pitch, and can increase the "tracks-per-inch" (TPI) value by 50% for the disk drive unit, as well as provides an advantageous reduction in the head seeking and settling time. Thus, the PZT micro-actuator 105 enables the disk drive device to have a significant increase in the surface recording density of the information storage disks used therein.

With reference to FIGS. 1b to 1d, the PZT micro-actuator 105 includes a ceramic U-shaped frame which has a bottom arm 137 and two ceramic beams or side arms 107 that hold the slider 103 there-between. Each ceramic beam 107 has a PZT element 208 thereon. The PZT micro-actuator 105 is physically coupled to the flexure 114. Three electrical connection balls 109 (gold ball bonding or solder ball bonding, GBB or SBB) are provided to couple the micro-actuator 105 to suspension inner traces 910 located at the side of each of the ceramic beams 107 of the micro-actuator 105. In addition, there are four metal balls 108 (GBB or SBB) for coupling the slider 103 to suspension outer traces 190 located at the side of each of the ceramic beams 107 of the micro-actuator 105. The slider 103 is partially bonded with the two ceramic beams 107 at two predetermined positions 106 by epoxy 112. This bonding makes the movement of the slider 103 dependent on the movement of the ceramic beams 107 of the micro-actuator 105. When power is supplied through the suspension traces 910, the PZT elements 208 expand or contract to cause the two ceramic beams 107 of the U-shape micro-actuator frame to deform, thereby making the slider 103 move on the track of the disk in order to fine tune the position of the read/write head. In this manner, controlled displacement of the slider 103 can be achieved for fine positional tuning. Also, a parallel gap 398 is formed between the micro-actuator 105 and the suspension tongue 328 in order to ensure free movement of the slider 103.

As is known to all, with the quickly increasing of the HDD capability, the actual HDD selling prices becomes lower and lower. The manufacturer are continue to develop methods to cut down the material cost in order to meet the market. A typically example is make the head slider smaller and smaller, etc. from 100% slider to 50% slider. The current is 30% slider and everyone is focusing on 20% slider now. Since reduction of the slider size results in reduction of the size of the air bearing surface (ABS) side of the slider, while a big capacity HDD must have a lower and lower slider flying height, so it is a big challenge on the design for ABS pattern of the slider and the static parameter of the suspension, for example, the stiffness of the suspension. Due to limitation in ABS design, a lower and lower stiffness is required for the suspension, for instance, the pitch stiffness of the suspension is less than 0.75 μN/mm and the roll stiffness of the suspension is less than 0.6 μN/mm. To achieve such a low stiffness, the flexure of the suspension has reduced its thickness from traditional 25 μm to 22 μm or thinner.

However, the thickness reduction of the flexure may cause a problem on slider dynamic performance, for example, the suspension tongue may be deformed, such a problem may become serious especially under circumstance when a micro-actuator is applied. FIG. 1e is a diagrammatic view showing the deformation of the suspension tongue 328 under the support of the dimple 329 of the load beam 115. As shown in FIG. 1e, the free end of the suspension tongue 328 is bent toward the micro-actuator 105, which will reduce the gap 398 between the micro-actuator 105 and the suspension tongue 328, even cause an interference between the micro-actuator 105 and the suspension tongue 328, which further deteriorates the dynamic performance of the slider 103, such as position adjustment performance.

Hence, it is desired to provide a lower stiffness suspension, a head gimbal assembly (HGA), and a disk drive unit with such suspension that are suitable for small size slider and micro-actuator to solve the above-mentioned problems.

SUMMARY OF THE INVENTION

Accordingly, an object of the present invention is to provide a suspension having a strengthening plate to make a small size slider mounted on the suspension have a good flying performance.

Another object of the present invention is to provide a HGA with a suspension that has a strengthening plate to make a small size slider mounted on the HGA have a good flying performance.

A further object of the present invention is to provide a disk drive unit with a suspension having a strengthening plate to make a small size slider mounted in the disk drive unit have a good flying performance.

To achieve the above-mentioned objects, a suspension for a HGA of the present invention a base plate, a flexure having a suspension tongue for holding a slider, a load beam, and a hinge that are assembled together; wherein a strengthening plate is formed on the suspension tongue to increase stiffness of the suspension tongue.

Preferably, the strengthening plate is integrally formed or is assembled with a plurality of bar bodies. According to an embodiment of the present invention, at least one groove is formed in the strengthening plate for lightening the suspension.

In an embodiment of the present invention, a plurality of clearances are defined between the adjacent bar bodies for lightening the suspension.

According to another embodiment of the present invention, a plurality of electrical pads are formed on the flexure at positions adjacent to two opposite sides of the strengthening plate, and a plurality of electrical traces are integrally formed on the strengthening plate for connecting the electrical pads. The strengthening plate extends from a leading end to a trailing end of the suspension tongue, which comprises a cover layer, a substrate layer, and an electric layer sandwiched between the cover layer and the substrate layer; and the cover layer, the substrate layer, and the electric layer form a protrusion with a certain thickness to support the micro-actuator. A plurality of island bumps are formed at the leading end of the suspension tongue, and the island bumps define a region in which at least one hole is formed.

A HGA of the present invention comprises a slider; a micro-actuator; and a suspension for supporting the slider and the micro-actuator; wherein the suspension comprises a base plate, a flexure having a suspension tongue for holding a slider, a load beam, and a hinge that are assembled together; wherein a strengthening plate is formed on the suspension tongue to increase stiffness of the suspension tongue.

According to an aspect of the present invention, a plurality of island bumps are formed at the leading end of the suspension tongue, and the island bumps define a region in which at least one hole is formed for increasing binding strength between the suspension tongue and the micro-actuator. In an embodiment of the invention, the flexure has a thickness less than 22 μm; and the cover layer is upper PI layer, the substrate layer is lower PI layer, and the electric layer is copper layer; the copper layer is sandwiched between the lower and the upper PI layers, the thickness of the lower PI layer is 5-10 μm, the thickness of the upper PI layer is 3-5 μm, and the copper layer is about 8-15 μm in thickness.

A disk drive unit of the present invention comprises a HGA; a drive arm to connect with the HGA; a disk; and a spindle motor to spin the disk; wherein the HGA comprises: a slider; a micro-actuator; and a suspension for supporting the slider and the micro-actuator; wherein the suspension comprises a base plate, a flexure having a suspension tongue for holding a slider, a load beam, and a hinge that are assembled together; wherein a strengthening plate is formed on the suspension tongue to increase stiffness of the suspension tongue.

By providing the strengthening plate on the suspension tongue, the suspension is partially strengthened, so the present invention enables the use of the suspension with lower pitch and roll stiffness while preventing deformation of the suspension. This ensures the slider mounted on the suspension has a good flying performance.

The present invention will be apparent to those skilled in the art by reading the following description of several particular embodiments thereof with reference to the attached drawings, in which:

BRIEF DESCRIPTION OF THE DRAWINGS

FIG. 1b is a perspective view of a HGA of the disk drive unit shown in FIG. 1a;

DETAILED DESCRIPTION OF THE PREFERRED EMBODIMENTS

Figure 1A:
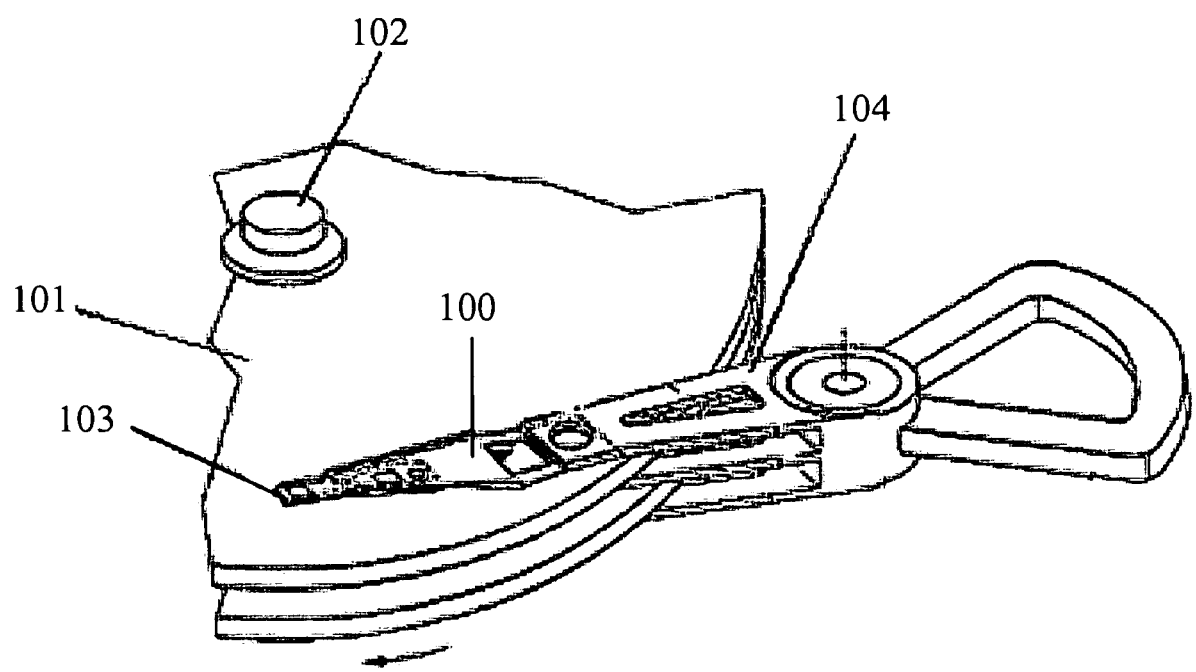
FIG. 1a shows a partial view of a conventional disk drive unit.
Figure 1B:
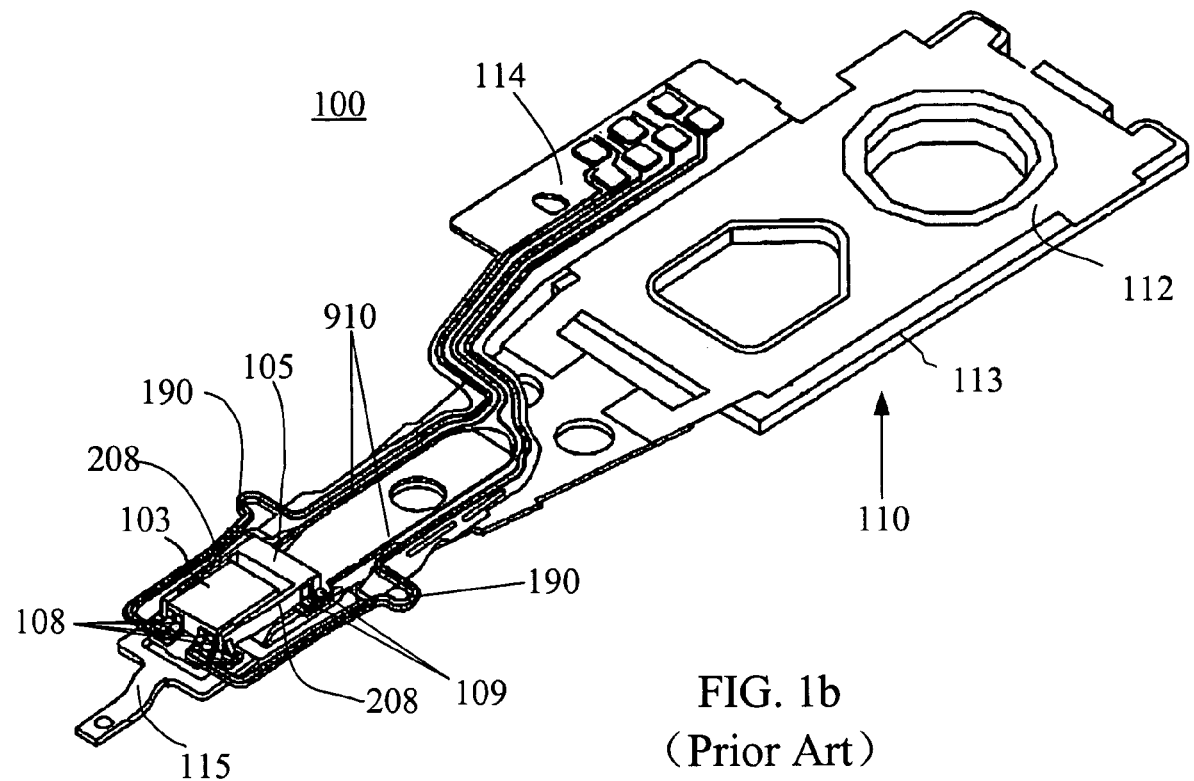
Figure 1C:
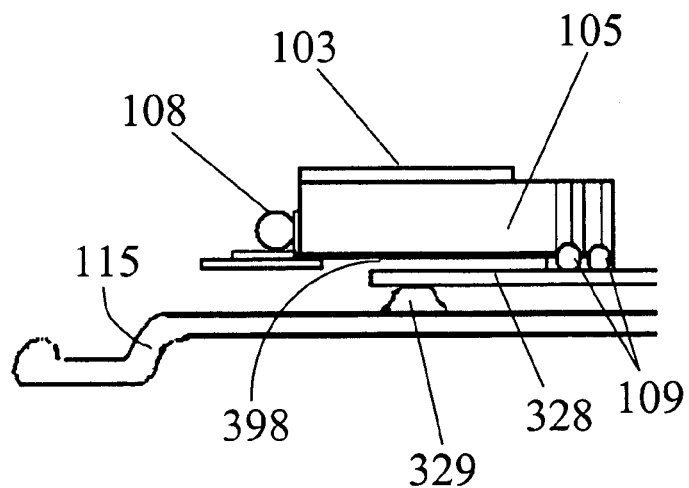
FIG. 1c is an enlarged, partial side perspective view of the HGA of FIG. 1b showing a suspension tongue thereof in detail.
Figure 1D:
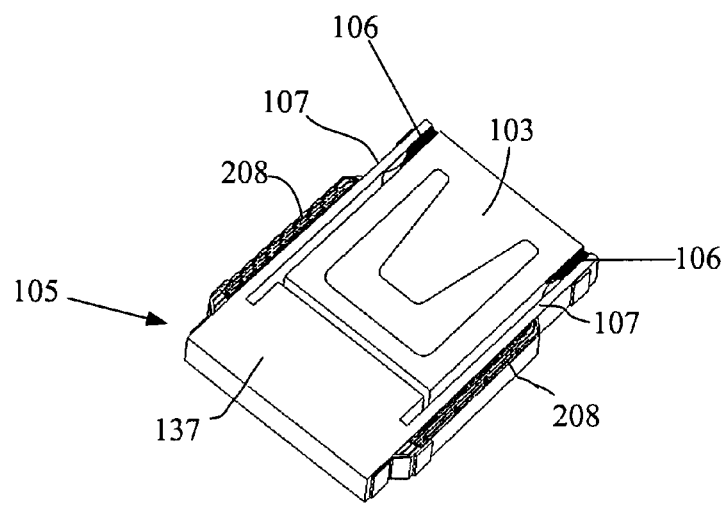
FIG. 1d is an assembled, perspective view of a micro-actuator and a slider of the HGA shown in FIG. 1c.
Figure 1E:
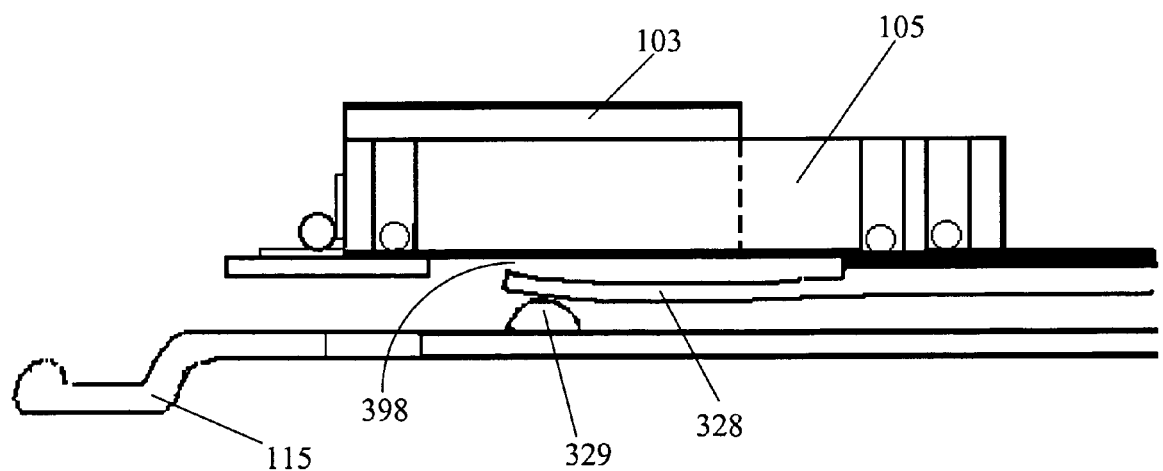
FIG. 1e is a diagrammatic view showing the deformation of the suspension tongue shown in FIG. 1c.

Various preferred embodiments of the instant invention will now be described with reference to the figures, wherein like reference numerals designate similar parts throughout the various views. As indicated above, the instant invention is designed to provide an improved suspension by adding a strengthening plate on a suspension tongue of a flexure of the suspension so as to partially strengthen stiffness of the suspension tongue to prevent deformation of the suspension tongue, so that the slider has a good dynamic and static performance together with a stable flying height when a small size slider is mounted thereon and flying on a rotating disk. In the present invention, the small size slider is 30% slider or smaller than 30% slider, such as 20% slider or 15% slider.

Figure 2:
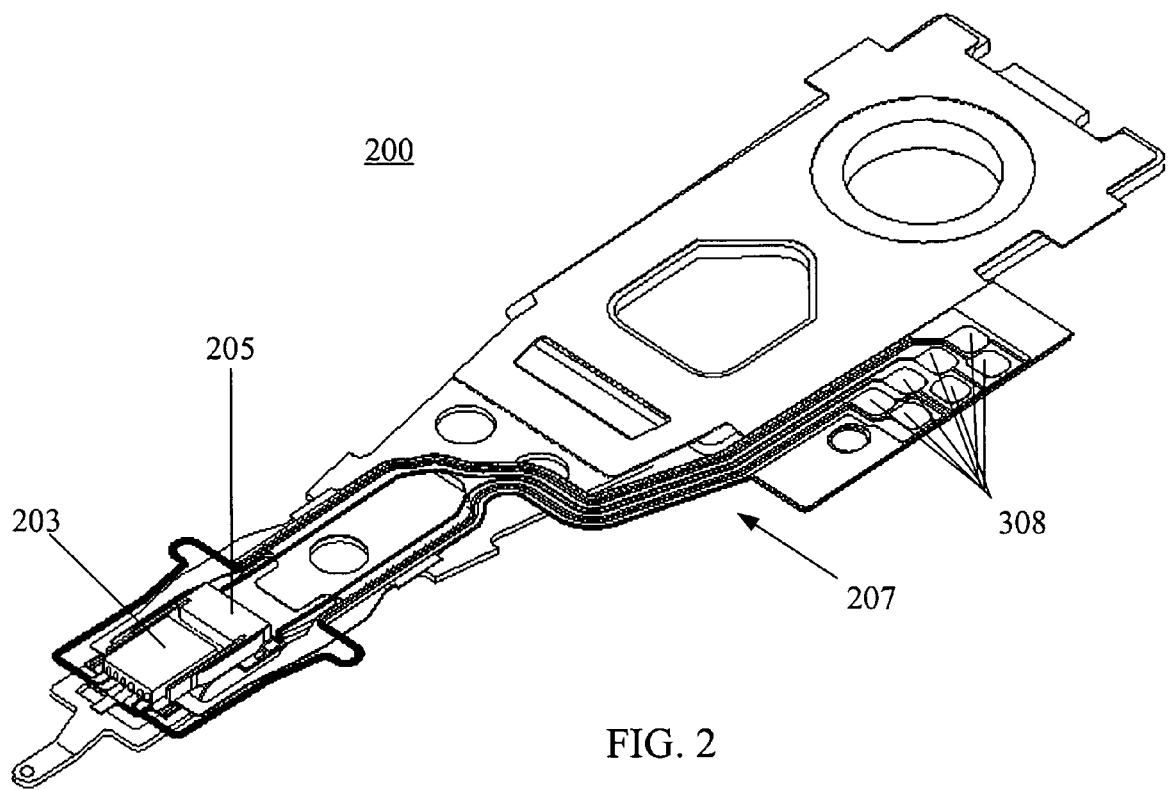
FIG. 2 is a perspective view of a HGA according to a first embodiment of the present invention.
Figure 3:
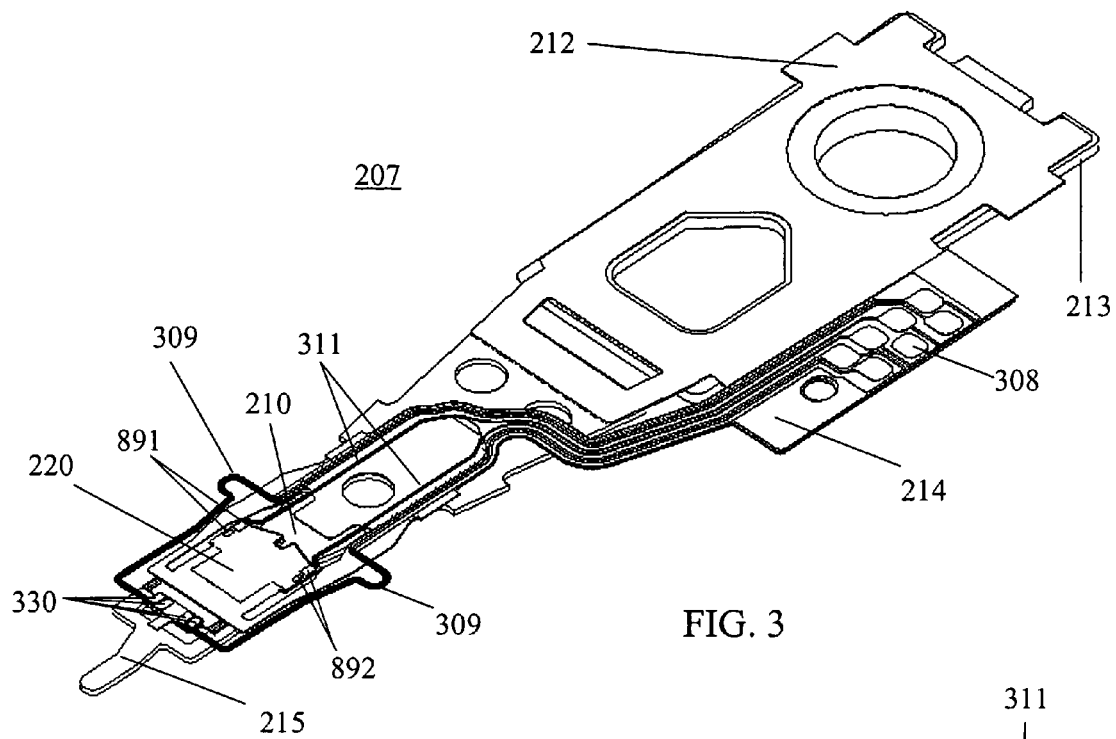
FIG. 3 is an assembled, perspective view of a suspension of the HGA of FIG. 2.
Figure 5:
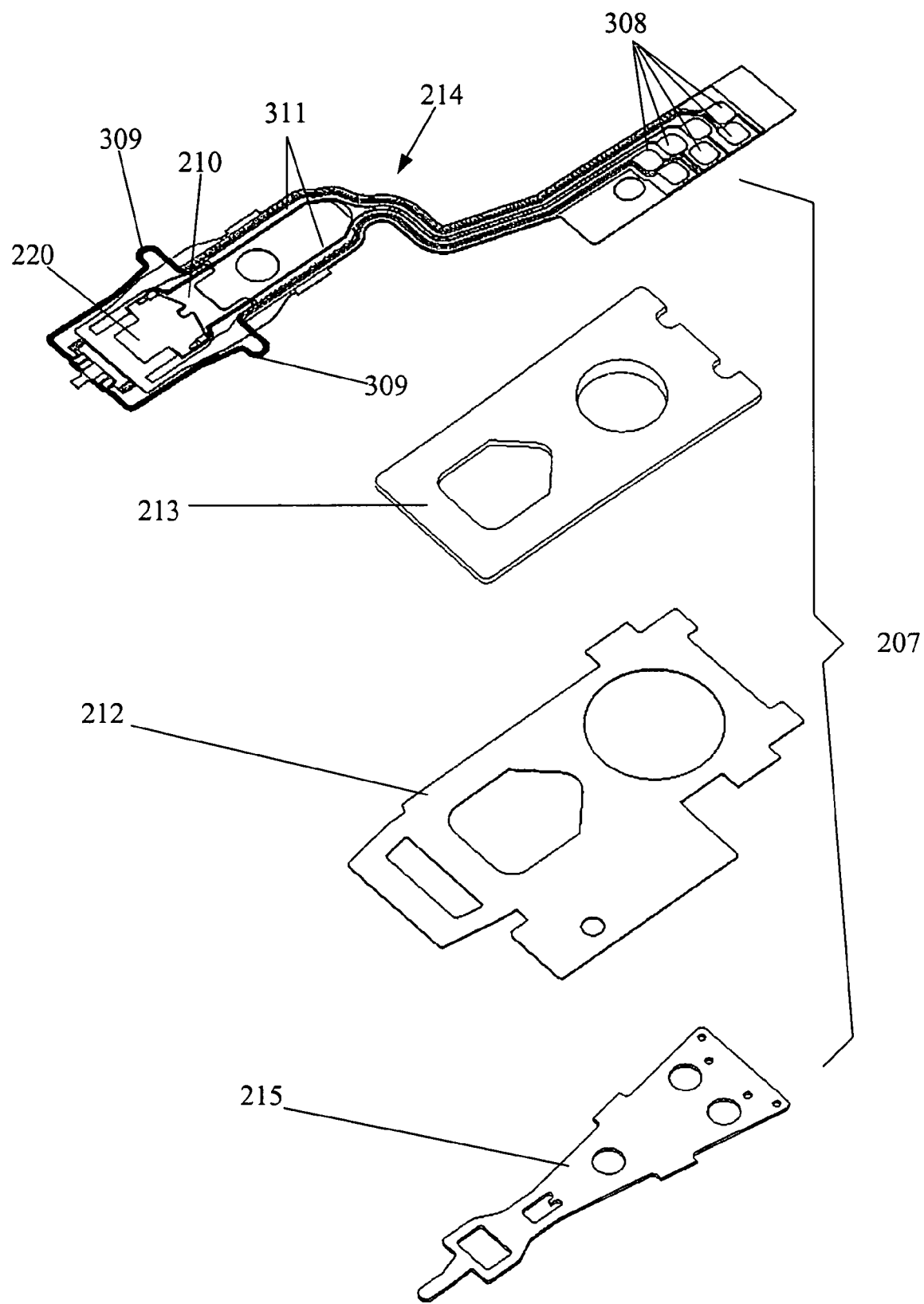
FIG. 5 is an exploded, perspective view of the suspension of FIG. 3.
Figure 6:
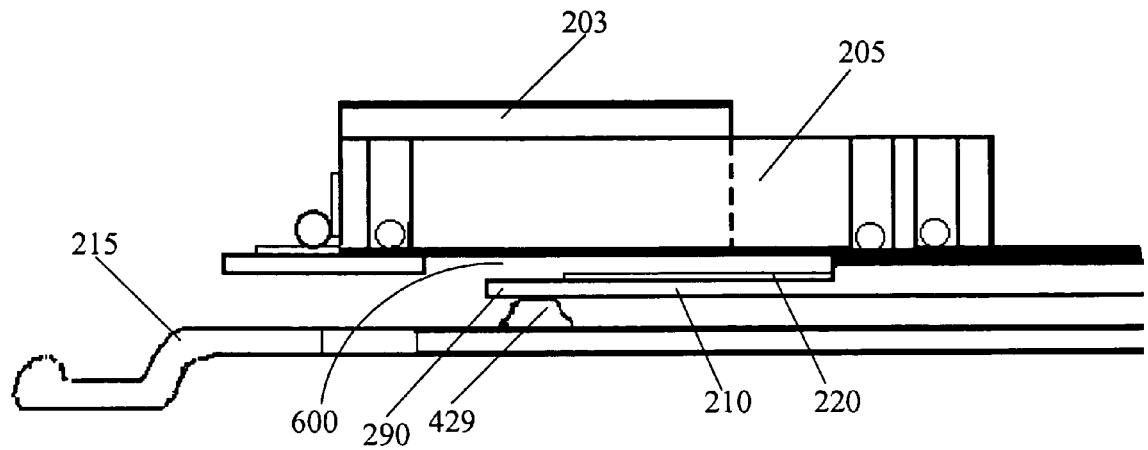
FIG. 6 is a side perspective view of FIG. 4.

With reference to FIG. 2, a HGA 200 according to an embodiment of the present invention comprises a slider 203, a micro-actuator 205, and a suspension 207 for supporting the slider 203 and the micro-actuator 205. Referring to FIGS. 3 and 5, the suspension 207 includes a base plate 213, a flexure 214, a load beam 215, and a hinge 212, which are assembled together. The flexure 214 provides a suspension tongue 210 for holding the slider 203 and the micro-actuator 205. The thickness of the flexure 214 is designed according to the specific size of the small size slider 203, generally less than 22 μm. To increase stiffness of the suspension tongue 210, a strengthening plate 220 is formed on the suspension tongue 210. On the flexure 214 a plurality of connection pads 308 are provided to connect with a control system (not shown) at one end, and a plurality of electrical multi-traces 309, 311 is provided at the other end. It will be appreciated that the electrical multi-traces 309, 311 can be flexible printed circuit (FPC) and can have a proper amount of conductive leads. Accordingly, the suspension tongue 210 has a plurality of electrical pads 330, 891, 892 thereon for connecting the electrical multi-traces 309, 311 respectively. As shown in FIG. 6, the load beam 215 has a dimple 429 formed thereon to support the suspension tongue 210 of the flexure 214.

Figure 8:
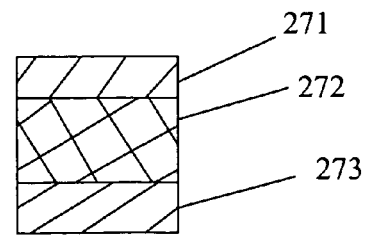
FIG. 8 is a sectional view of a strengthening plate formed on the suspension of FIG. 3.

The strengthening plate 220 may be made of any material with suitable stiffness. According to an embodiment shown in FIG. 8, the strengthening plate 220 comprises a lower polyimide (PI) layer 273, a copper layer 272, and an upper polyimide (PI) layer 271. The copper layer 272 is sandwiched between the lower and the upper PI layers 273, 271. The thickness of the lower PI layer 273 is generally 5-10 μm, and the thickness of the upper PI layer 271 is 3-5 μm. The copper layer 272 has a thickness of about 8-15 μm.

Figure 4:
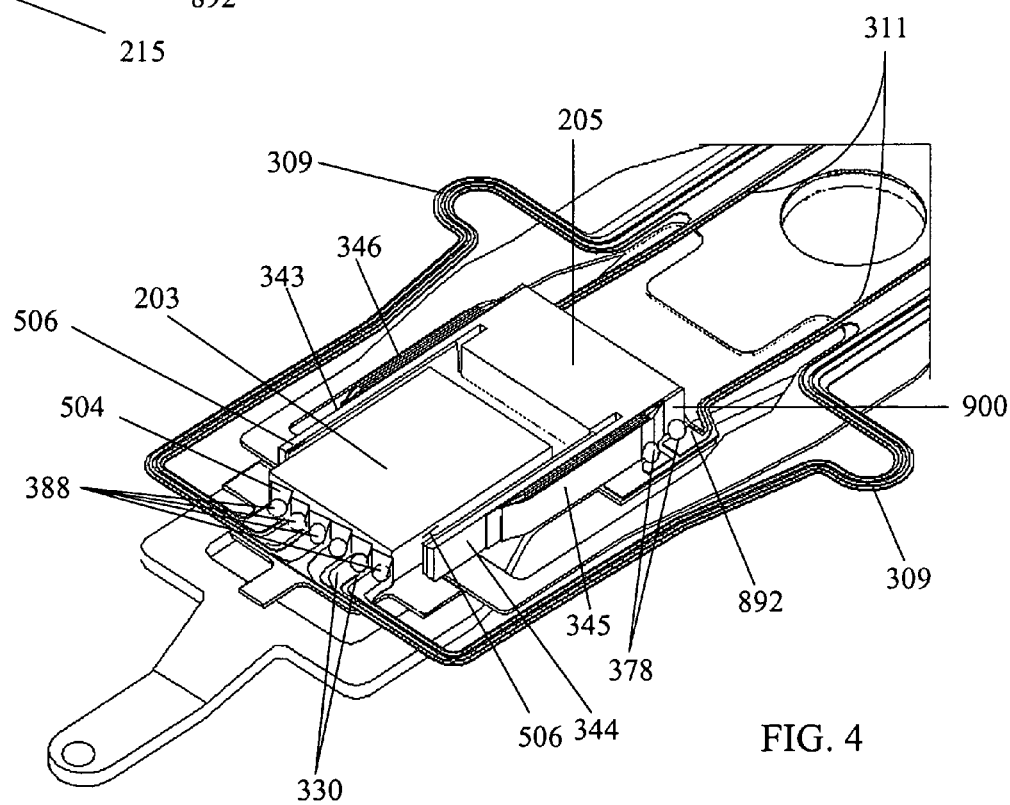
FIG. 4 is a partial perspective view of the HGA of FIG. 2 showing the region where a suspension tongue of the HGA lies in greater detail.
Figure 7:
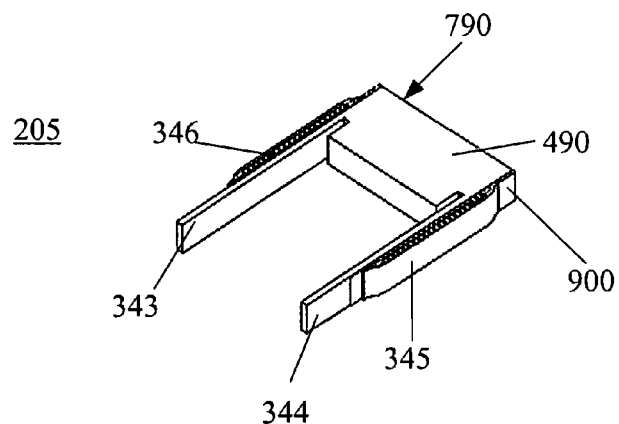
FIG. 7 is a perspective view of a micro-actuator of the HGA of FIG. 2.

Referring to FIGS. 4, 6 and 7, the micro-actuator 205 includes a U-shaped frame 790 which has a pair a side arms 343, 344 and a bottom arm 490. Two PZT elements 345, 346 are attached to the pair of side arms 343, 344 respectively. The PZT elements 345, 346 may be selected from ceramic PZT elements, thin film PZT elements, PMN-PT PZT elements and so on, and may be monolayer structure or laminated structure. The PZT elements 345, 346 have a plurality of electrical connection pads 900 on sides thereof. The slider 203 also has a plurality of electrical connection pads 504. A plurality of electrical connection metal balls (gold ball bonding or solder ball bonding, GBB or SBB) 378 are provided to couple the electrical connection pads 900 of the PZT elements 345, 346 to the electrical pads 891, 892 of the suspension tongue 210, which makes the PZT elements 345, 346 and the electrical multi-traces 311 located at two sides of the side arms 343, 344 electrically connect. In addition, there is a plurality of electrical connection metal balls (GBB or SBB) 388 for coupling the electrical connection pads 504 of the slider 203 to the electrical pads 330 of the suspension tongue 210, thereby the slider 203 and the electrical multi-traces 309 are connected. Thus the control system connected with the electrical multi-traces 309, 311 can respectively control the slider 203 and the micro-actuator 205 through the electrical multi-traces 309, 311. The bottom arm 490 of the micro-actuator 205 is bonded on the suspension tongue 210 by epoxy with a parallel gap 600 formed between the micro-actuator 205 and the suspension tongue 210. The gap 600 may ensure the slider moves freely under drive of the micro-actuator 205.

Referring to FIG. 4, the slider 203 is partially bonded with the two side arms 343, 344 at two predetermined positions 506 by epoxy 112. This bonding makes the movement of the slider 203 dependent on the movement of the side arms 343, 344 of the micro-actuator 205. When power is supplied through the suspension traces 311, the PZT elements 345, 346 expand or contract to cause the two side arms 343, 344 of the U-shaped frame 790 to deform, thereby making the slider 203 move on the track of the disk in order to fine tune the position of the read/write head. In this manner, controlled displacement of the slider 203 can be achieved for fine positional tuning.

With reference to FIGS. 4 and 6, after the suspension 207 is assembled, the dimple 429 of the load beam 215 supports the suspension tongue 210 and always transfers the loading force to the center of the slider 203. As the suspension 207 of the present invention is designed to assemble with small size slider and micro-actuator, the suspension tongue 210 must be thin enough to ensure such small size slider moves normally on a spinning disk. However, too thin suspension tongue 210 is apt to deform when being exerted to a force. So the strengthening plate 220 is provided on the suspension tongue 210 to strengthen the suspension tongue 210, especially the region adjacent to the dimple 429, thereby preventing the suspension tongue 210 from deformation, and also preventing its free end 290 from being bent. This ensures that the parallel gap 600 between the micro-actuator 205 and the suspension tongue 210 will not be decreased, and, in turn, ensures the slider 203 move freely under drive of the micro-actuator 205.

Figure 9:
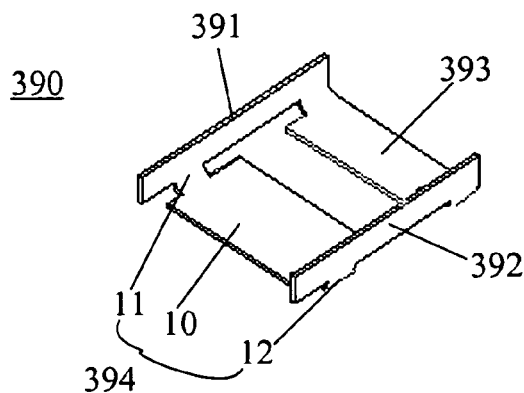
FIG. 9 is a perspective view of an embodiment of a frame for the micro-actuator of the HGA.

FIG. 9 shows a frame 390 for the micro-actuator 205 according to another embodiment. The fame 390 can be made of metal (for example, stainless steel), ceramic, or polymer material. The frame 390 has a bottom arm 393, an active arm 394, and a pair of side arms 391, 392. A pair of PZT elements (not shown in FIG. 9) is mounted on the pair of side arms 391, 392 respectively. The pair of PZT elements 391, 392 is symmetric about an axis of the bottom arm 393 and respectively connects the bottom arm 393 and the active arm 394. As shown in FIG. 6, the bottom arm 393 connects the suspension tongue 210. In the present embodiment, the space between the pair of side arms 391, 392 is bigger than the width of the slider 203. When the slider 203 is mounted on the frame 390, there forms two gaps between the frame 390 and the slider 203. In addition, the active arm 394 has a support portion 10 to support the slider 203 and two connection portions 11, 12 that connect two opposite ends of the support portion 10 to the side arms 391, 392. Each of the connection portions 11, 12 is narrower than the support portion 10, so notches are formed between the support portion and the side arms 391, 392. To increase elasticity of the frame 390, notches are also formed between the bottom arm 393 and the side arms 391, 392. Particularly, the support portion 10 is shaped in rectangular and perpendicularly connects the connection portions 11, 12.

Figure 10:
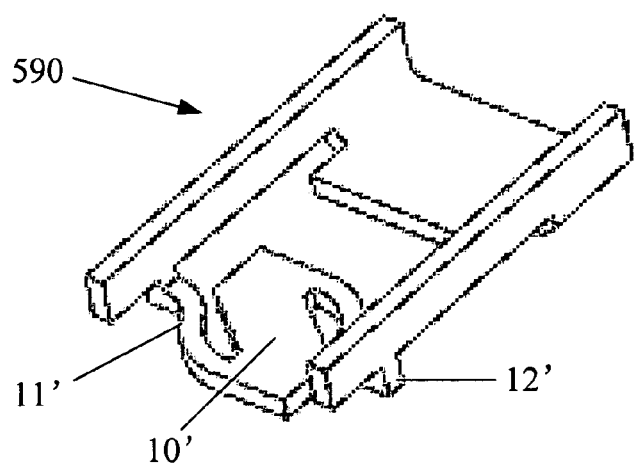
FIG. 10 is a perspective view of another embodiment of a frame for the micro-actuator of the HGA.

FIG. 10 shows a frame 590 for the micro-actuator 205 according to another embodiment which is similar to the one shown in FIG. 9. The difference is that the support portion 10' is irregularly shaped and the connections 11', 12' are curve-shaped. It is understandable that the frame for the micro-actuator can take any other proper structures except the above embodiments.

Figure 11:
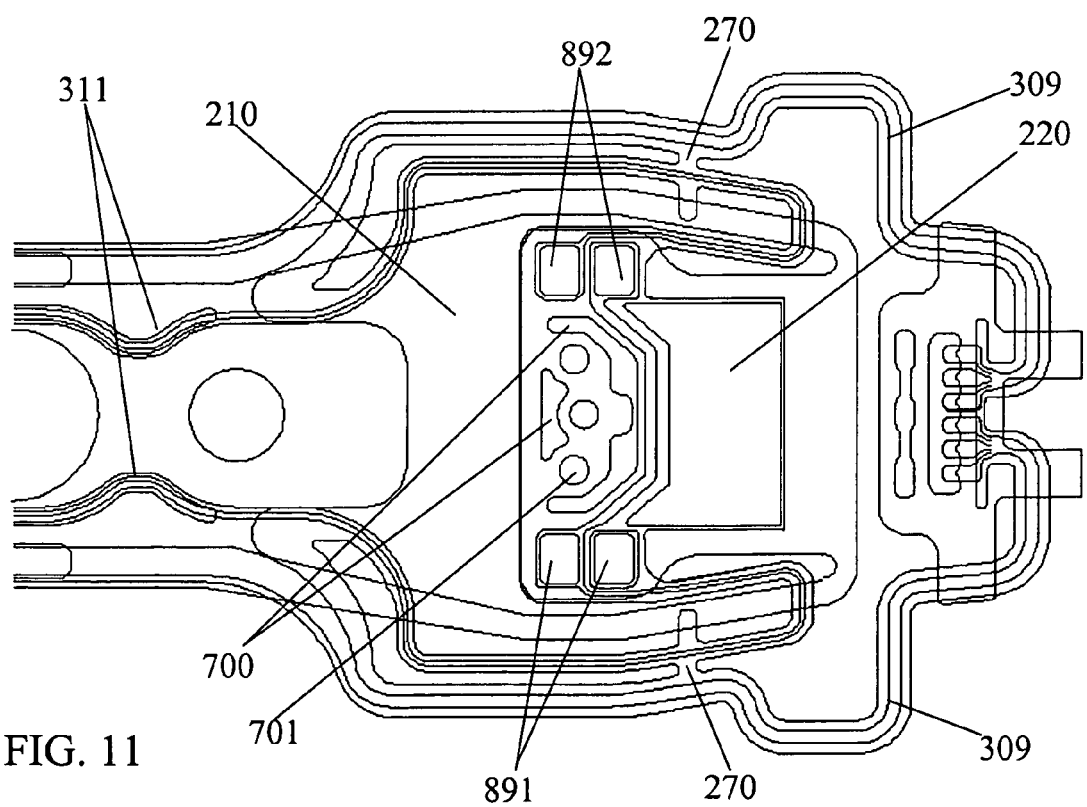
FIGS. 11-15 are partial plan views of five distinct embodiments of a flexure for the suspension.

Referring to FIG. 11, in an embodiment of the present suspension, the strengthening plate 220 provided on the suspension tongue 210 is integrally formed. The strengthening plate 220, extending from a leading end to a trailing end of the suspension tongue 210, includes a cover layer, a substrate layer, and an electric layer sandwiched between the cover layer and the substrate layer. The cover layer, the substrate layer, and the electric layer together form a protrusion with a certain thickness to support the micro-actuator 205. A plurality of island bumps 700 and the electrical pads 891, 892 are formed at the leading end of the suspension tongue 210. The island bumps 700 locate between the electrical pads 891, 892 and define a class-closed region in which at least one, such as three, hole 701 is formed. The hole 701 is used for containing mounting material, such as UV epoxy or resin, applied on the suspension tongue 210 and, in turn, increasing binding strength between the suspension tongue 210 and the micro-actuator 205 mounted thereon. So the micro-actuator 205 is reliably mounted on the suspension tongue 210. In addition, the micro-actuator 205 is supported by the island bumps 700. Comparing with the traditional method that the micro-actuator 205 is supported by a surface of the suspension tongue, which may be not even enough due to manufacturing tolerances, the micro-actuator 205 of the present invention is more stable due to its special structure. The strengthening plate 220 is electrically connected to the electrical pads 891, 892 by electrical traces integrally formed with the electric layer thereof. The suspension 207 further comprises two trace support bridges 270 at two opposite sides thereof to support the electrical multi-traces 309, 311. The trace support bridges 270 in the present embodiment is shaped as a strip and long enough to support the electrical multi-traces 309, 311. The trace support bridges 270 are preferably made of polyimide (PI) material to have adequate intension and stiffness. It is understandable that the trace support bridges 270 can also be made of any other suitable material as long as they can support the electrical multi-traces 309, 311. Supported by the trace support bridges 270, the electrical multi-traces 309, 311 are reduced or avoided deformation in manufacture operation and vibration when the slider 203 is flying on the disk, so the HGA 200 has a good dynamic and static performance. Meanwhile, the trace support bridges 270 can increase lateral stiffness of the flexure 13, which also improves the HGA 200 in dynamic and static performance. It can be seen that the amount of the trace support bridges 270 can be modified according to the requirement from the flexure 13 and the suspension 207, and that the trace support bridges 270 can adopt other suitable shapes.

Figure 12:
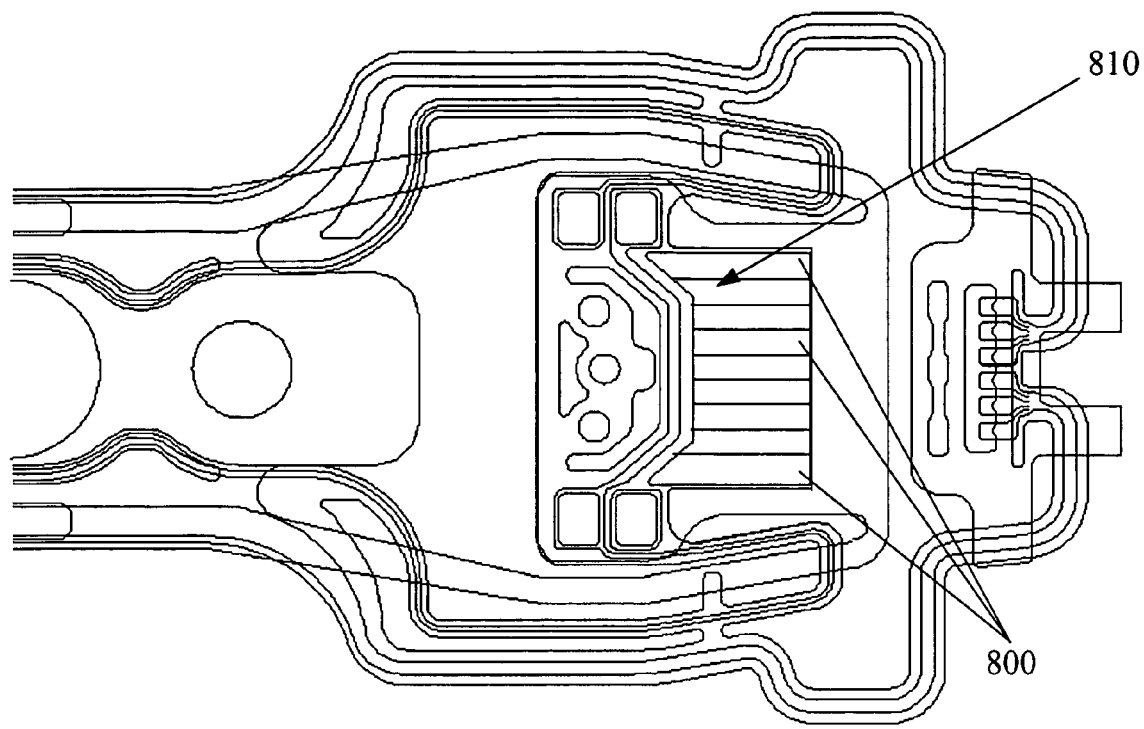

Referring to FIG. 12, in another embodiment of the present suspension, the strengthening plate provided on the suspension tongue 210 is designated 810. The strengthening plate 810 is transversely assembled along the suspension 207 by a plurality of bar bodies 800, and there are no clearances between the adjacent bar bodies 800. The bar bodies 800 are straight bar body.

Figure 13:
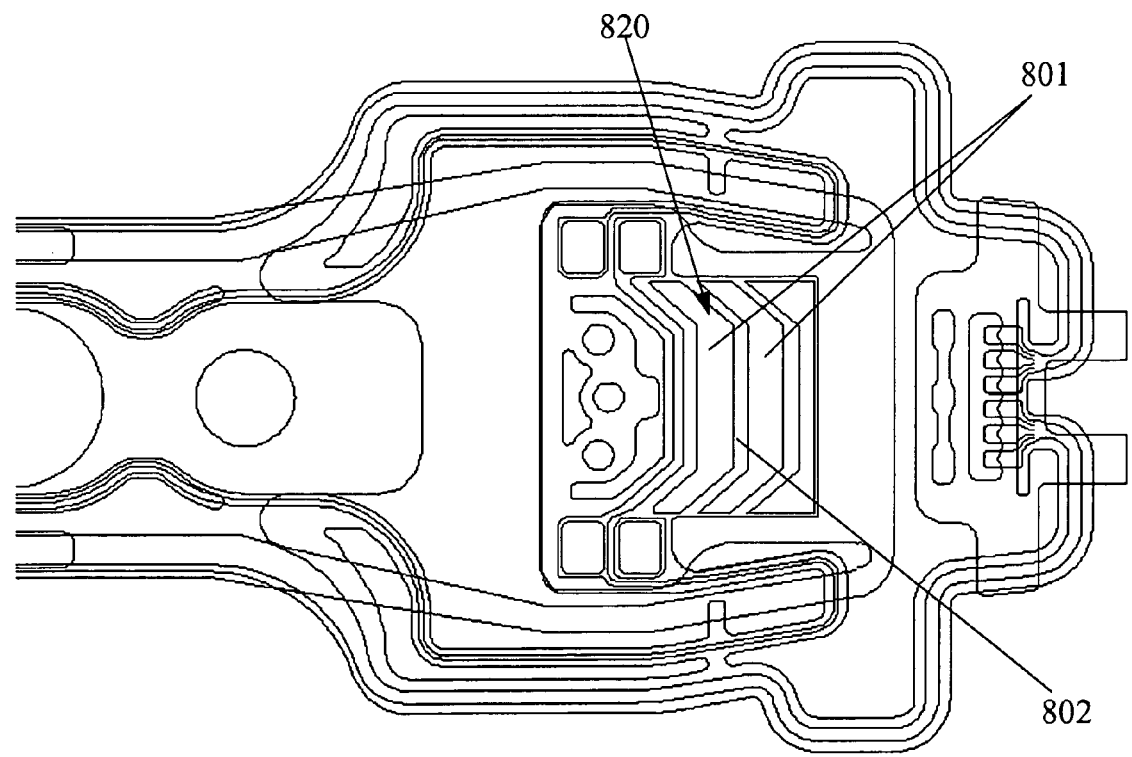

Referring to FIG. 13, in a further embodiment of the present suspension, the strengthening plate provided on the suspension tongue 210 is designated 820. The strengthening plate 820 is longitudinally spliced along the suspension 207 by a plurality of bar bodies 801, and there define clearances 802 between the adjacent bar bodies 801 so as to lighten the suspension 207. The bar bodies 801 are crooked.

Figure 14:
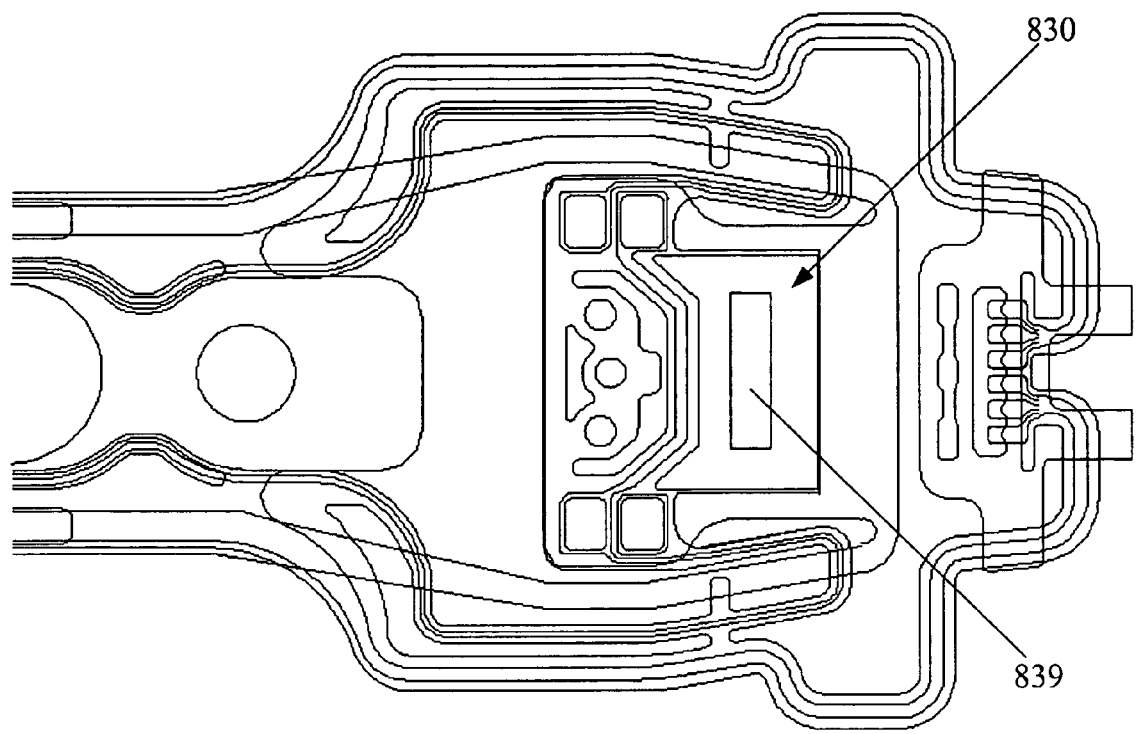

Referring to FIG. 14, in a further embodiment of the present suspension, the strengthening plate provided on the suspension tongue 210 is designated 830. The strengthening plate 830 is integrally formed. A groove 839 is defined in the strengthening plate 830 so as to lighten the suspension 207.

Figure 15:
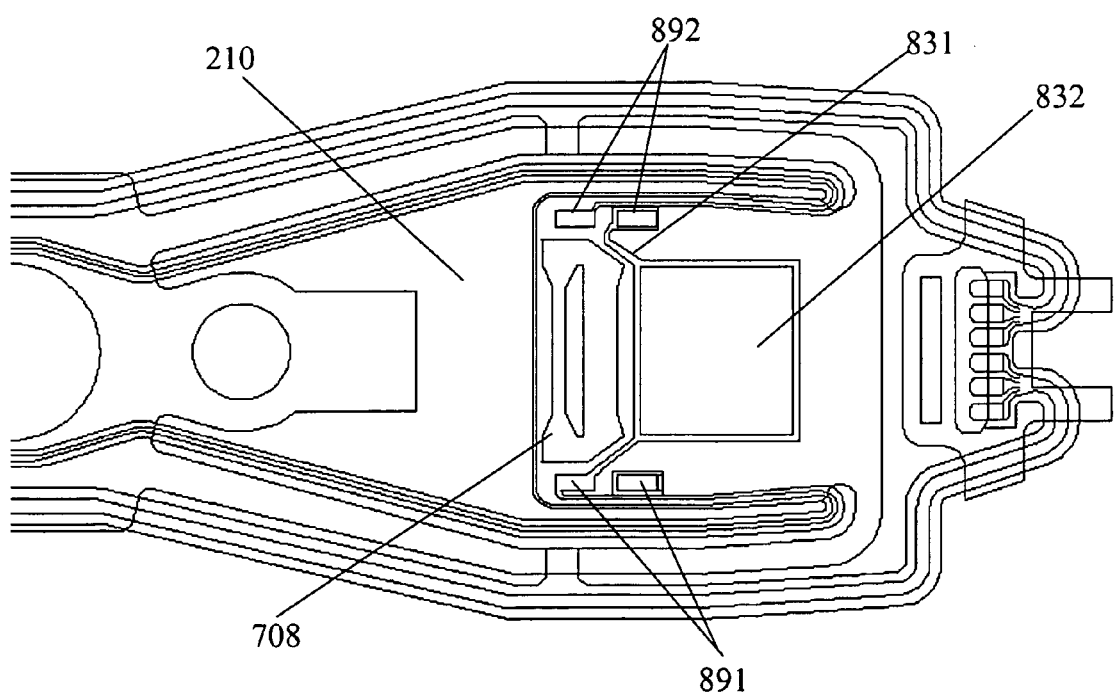

Referring to FIG. 15, in a further embodiment of the present suspension, the strengthening plate provided on the suspension tongue 210 is designated 832. The strengthening plate 832 electrically connects the electrical pads 891, 892 adjacent to two opposite sides thereof by electrical traces 831. The island bumps behind the strengthening plate 832 are modified into loop bumps 708. The strengthening plate 832 is square and integrally formed. The electrical traces 831 are integrally formed with the strengthening plate 832.

Generally, when the pitch stiffness and the roll stiffness of the suspension assembled with a small size slider are both less than 1.00 μ/mm, for example, the suspension pitch stiffness is less than 0.75 μN/mm, and the suspension roll stiffness less than 0.65 μN/mm, the slider has a good fly stability. However, too low pitch and roll stiffness of the suspension results in partial deformation of the flexure, such as the suspension tongue. This affects the flying performance of the slider. The present invention enables the use of a suspension with lower pitch and roll stiffness while prevents the suspension deformation by adding a strengthening plate one the suspension tongue. Moreover, partially strengthened, the suspension will not be weighted too much. This ensures a disk drive unit with the suspension still has a good shock performance.

Figure 16:
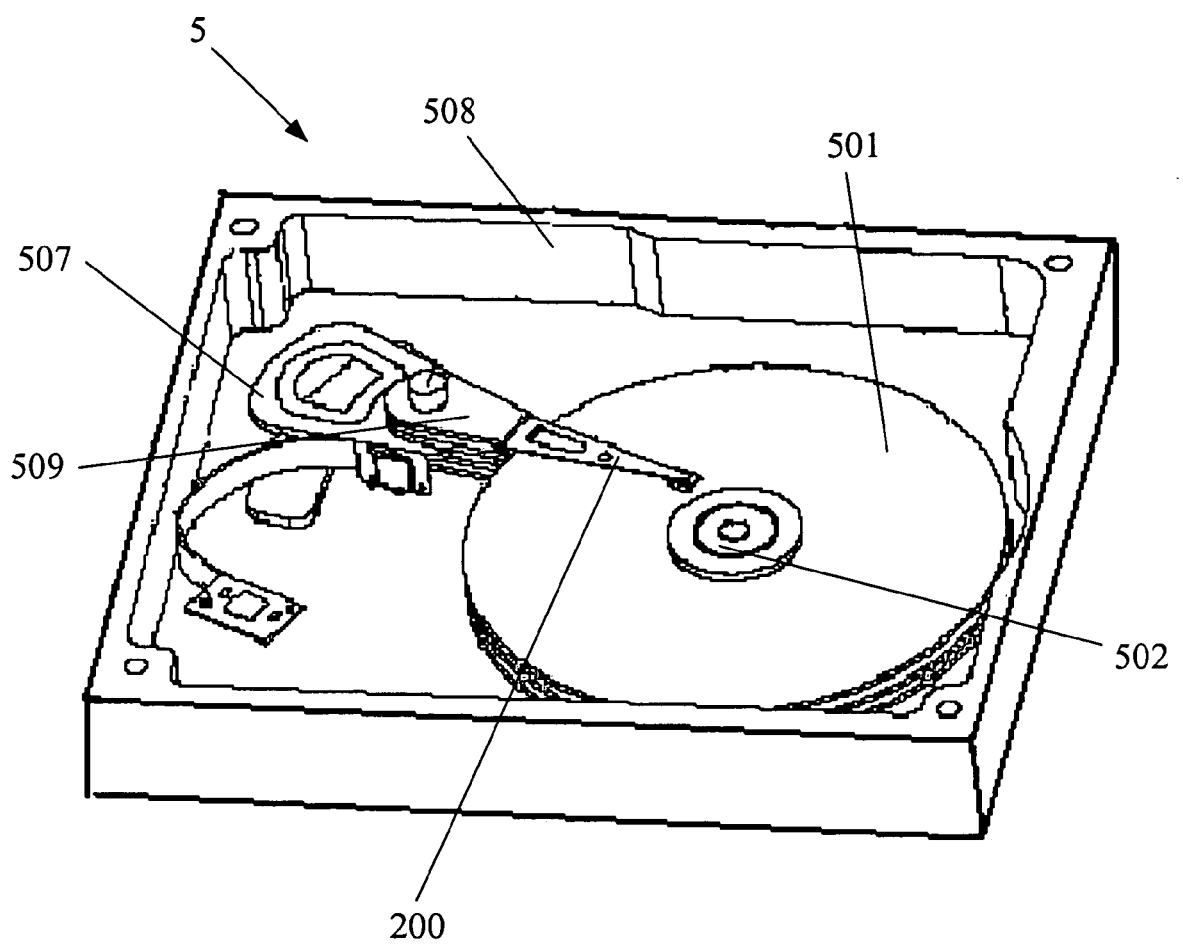
FIG. 16 is a perspective view of an embodiment of a disk drive unit including the HGA of FIG. 2.

Referring to FIG. 16, according to an embodiment of the present invention, a disk drive unit 5 can be attained by assembling a housing 508, a disk 501, a spindle motor 502, a VCM 507, and a drive arm 509 with the HGA 200 of the present invention. Because the structure and/or assembly process of disk drive unit of the present invention are well known to persons ordinarily skilled in the art, a detailed description of such structure and assembly is omitted herefrom. In addition, a HGA with a PZT micro-actuator of other embodiments or other suitable type micro-actuator can also be applied to the present invention, so long as it has a suspension with a strengthening plate according to the present invention.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A suspension for a head gimbal assembly comprising:
   a base plate, a flexure having a suspension tongue for holding a slider, a load beam, and a hinge that are assembled together; wherein
   a strengthening plate is formed on the suspension tongue to increase stiffness of the suspension tongue, wherein the strengthening plate extends from a leading end to a trailing end of the suspension tongue, which comprises a cover layer, a substrate layer, and an electric layer sandwiched between the cover layer and the substrate layer, and the cover layer, the substrate layer, and the electric layer form a protrusion with a certain thickness to support the micro-actuator.

2. The suspension as claimed in claim 1, wherein the strengthening plate is integrally formed, or assembled with a plurality of bar bodies.

3. The suspension as claimed in claim 1, wherein at least one groove is formed in the strengthening plate for lightening the suspension.

4. The suspension as claimed in claim 2, wherein a plurality of clearances are defined between the adjacent bar bodies for lightening the suspension.

5. The suspension as claimed in claim 1, wherein a plurality of electrical pads are formed on the flexure at positions adjacent to two opposite sides of the strengthening plate, and a plurality of electrical traces are integrally formed on the strengthening plate for connecting the electrical pads.

6. The suspension as claimed in claim 1, wherein a plurality of island bumps are formed at the leading end of the suspension tongue, and the island bumps define a region in which at least one hole is formed.

7. A head gimbal assembly comprising:
a slider;
a micro-actuator; and
a suspension for supporting the slider and the micro-actuator; wherein
the suspension comprises a base plate, a flexure having a suspension tongue for holding a slider, a load beam, and a hinge that are assembled together; wherein
a strengthening plate is formed on the suspension tongue to increase stiffness of the suspension tongue, wherein
the strengthening plate extends from a leading end to a trailing end of the suspension tongue, which comprises a cover layer, a substrate layer, and an electric layer sandwiched between the cover layer and the substrate layer, and
the cover layer, the substrate layer, and the electric layer form a protrusion with a certain thickness to support the micro-actuator.

8. The head gimbal assembly as claimed in claim 7, wherein the strengthening plate is integrally formed, or assembled with a plurality of bar bodies.

9. The head gimbal assembly as claimed in claim 8, wherein at least one groove is defined in the strengthening plate for lightening the suspension.

10. The head gimbal assembly as claimed in claim 8, wherein a plurality of clearances are defined between the adjacent bar bodies for lightening the suspension.

11. The head gimbal assembly as claimed in claim 8, wherein a plurality of electrical pads are formed on the flexure at positions adjacent to two opposite sides of the strengthening plate, and a plurality of electrical traces are integrally formed on the strengthening plate for connecting the electrical pads.

12. The head gimbal assembly as claimed in claim 8, wherein the strengthening plate extends from a leading end to a trailing end of the suspension tongue, which comprises a cover layer, a substrate layer, and an electric layer sandwiched between the cover layer and the substrate layer; and the cover layer, the substrate layer, and the electric layer form a protrusion with a certain thickness to support the micro-actuator.

13. The head gimbal assembly as claimed in claim 12, wherein the flexure has a thickness less than 22 $\mu$m; and the cover layer is upper PI layer, the substrate layer is lower PI layer, and the electric layer is copper layer; the copper layer is sandwiched between the lower and the upper PI layers, the thickness of the lower PI layer is 5-10 $\mu$m, the thickness of the upper PI layer is 3-5 $\mu$m, and the copper layer is about 8-15 $\mu$m in thickness.

14. The head gimbal assembly as claimed in claim 13, wherein a plurality of island bumps are formed at the leading end of the suspension tongue, and the island bumps define a region in which at least one hole is formed for increasing binding strength between the suspension tongue and the micro-actuator.

15. A disk drive unit comprising:
a head gimbal assembly;
a drive arm to connect with the head gimbal assembly;
a disk; and
a spindle motor to spin the disk;
wherein the head gimbal assembly comprises:
a slider;
a micro-actuator; and
a suspension for supporting the slider and the micro-actuator; wherein
the suspension comprises a base plate, a flexure having a suspension tongue for holding a slider, a load beam, and a hinge that are assembled together; wherein
a strengthening plate is formed on the suspension tongue to increase stiffness of the suspension tongue, wherein
the strengthening plate extends from a leading end to a trailing end of the suspension tongue, which comprises a cover layer, a substrate layer, and an electric layer sandwiched between the cover layer and the substrate layer, and
the cover layer, the substrate layer, and the electric layer form a protrusion with a certain thickness to support the micro-actuator.

* * * * *